(12) United States Patent
Bogoslofski et al.

(10) Patent No.: US 8,286,843 B2
(45) Date of Patent: Oct. 16, 2012

(54) ROTATABLE HITCH MOUNTABLE LOAD CARRIER

(75) Inventors: Kevin Bogoslofski, Southington, CT (US); Vincent Bove, Bethlehem, CT (US); Brian Joder, Folsom, CA (US)

(73) Assignee: Thule Sweden AB (SE)

( * ) Notice: Subject to any disclaimer, the term of this patent is extended or adjusted under 35 U.S.C. 154(b) by 336 days.

(21) Appl. No.: 11/306,843

(22) Filed: Jan. 12, 2006

(65) Prior Publication Data
US 2006/0273125 A1 Dec. 7, 2006

Related U.S. Application Data

(63) Continuation of application No. 11/159,159, filed on Jun. 23, 2005, now abandoned.

(60) Provisional application No. 60/593,495, filed on Jan. 19, 2005, provisional application No. 60/582,382, filed on Jun. 23, 2004.

(51) Int. Cl.
*B60R 9/00* (2006.01)
*B60R 9/10* (2006.01)

(52) U.S. Cl. ............... 224/509; 224/532; 224/924

(58) Field of Classification Search ............ 224/509, 224/502, 505, 506, 519, 222, 525, 531, 532, 224/924; 414/462
See application file for complete search history.

(56) References Cited

U.S. PATENT DOCUMENTS

| | | | | |
|---|---|---|---|---|
| 2,195,366 A * | 3/1940 | Haigh | .............. | 108/44 |
| 5,037,162 A * | 8/1991 | Ransom | .............. | 312/236 |
| 5,518,156 A * | 5/1996 | Lehman | .............. | 224/281 |
| 5,664,717 A * | 9/1997 | Joder | .............. | 224/502 |
| 6,123,498 A * | 9/2000 | Surkin | .............. | 414/462 |
| 6,250,483 B1 * | 6/2001 | Frommer | .............. | 212/180 |
| 6,644,525 B1 * | 11/2003 | Allen et al. | .............. | 224/497 |
| 6,701,913 B1 * | 3/2004 | LeDuc et al. | .............. | 224/506 |
| 6,745,926 B2 * | 6/2004 | Chimenti | .............. | 224/509 |
| 6,921,007 B1 * | 7/2005 | Guerrant | .............. | 224/519 |

* cited by examiner

*Primary Examiner* — Justin Larson
(74) *Attorney, Agent, or Firm* — Novak Druce + Quigg LLP

(57) ABSTRACT

A vehicle mountable load carrier generally includes a connecting member for insertion into a hitch mount receiver of a vehicle, an upright post connected to the connecting member and an upright load supporting member coupled to the upright post by an extendable support arm having an open and closed positions. The extendable support arm includes at least a first section and a second section and has a pivoting coupling therebetween such that at least the second section can be moved between a closed position and an open position. The pivoting coupling includes a releasable lock to retain the extendable support arm in a locked-open position.

13 Claims, 6 Drawing Sheets ized shifting of the load carrier, uncontrolled shifting of load carrier components, undesirable shifting of equipment secured thereon, possible damage to equipment or transporting vehicle, or injury to users.
ROTATABLE HITCH MOUNTABLE LOAD CARRIER

CROSS-REFERENCE TO RELATED APPLICATIONS

The present application is a continuation application of U.S. application Ser. No. 11/159,159 filed Jun. 23, 2005 which claims the benefit of U.S. Provisional Application Nos. 60/522,495 filed Oct. 6, 2004 and 60/582,382 filed Jun. 23, 2004. Said applications are expressly incorporated herein by reference in their entireties.

FIELD OF THE INVENTION

The present invention relates generally to vehicle load carriers, and more specifically, to vehicle load carrier assemblies mountable to rearward sides of vehicles.

BACKGROUND OF THE INVENTION

Attachment of load carriers to rearward sides of vehicles, using hitch-mount receivers, is known. Such hitch-mounted load carriers typically allow the convenient transportation of equipment, such as bicycles. One type of hitch-mounted load carrier comprises a hinged, or swing-away, type carrier.

Hinged, or swing-away, type hitch mounted load carriers typically include diamond-style extendable carriers and two-arm swing-away carriers. Diamond style extendable carriers are described in U.S. Pat. Nos. 6,745,926 B2 and U.S. Pat. No. 6,085,954 (Bloemer). Two-arm swing away style carriers are described in U.S. Pat. No. 5,664,717 (Joder) and U.S. Pat. No. 5,454,496 (Sumida et al.). Swing-away type load carriers typically include multiple pivot linkages that allow the extending arms to be swung away and distanced from the transporting vehicle during loading and unloading. A problem with these devices, however, is that their extending arms can tend to rotate, or sag, at their hinged connections. Additionally, as the number of hinged connections increases, or as the weight of equipment loaded upon the extending arms increases, sagging may become more pronounced. This can be problematic because sagging tends to angularly displace the upright load supporting members, from their preferred vertical orientation. When this occurs, it can be difficult to properly latch the load supporting member to a stationary portion of the carrier, which is typically connected to the vehicle's hitch receiver by means of a connecting arm, or stinger portion. Preferably, then, when the load carrier is in a traveling configuration, a parallel relationship is maintained between a fixed upright post, which is typically attached to the vehicle's hitch receiver by the connecting arm (stinger portion), and an upright load supporting member. Lack of parallelism between the upright post and the upright load supporting member can make it difficult to securely connect the upright post and the upright load supporting member. Consequently, minimizing play and sagging of the extending pivoting arms of a swing-away type load carriers and their connections to the carrying vehicle would be advantageous.

Another problem associated with known swing-away type load carriers is that during loading and unloading, the pivoting sections can inadvertently rotate, which can result in undesirable shifting of the load carrier, uncontrolled shifting of load carrier components, undesirable shifting of equipment secured thereon, possible damage to equipment or transporting vehicle, or injury to users.

In view of the above, there is a longfelt need to address these and other disadvantages.

SUMMARY OF THE INVENTION

The present invention incorporates several features that minimize the disadvantages outlined above, particularly with respect to the uncontrolled shifting of a load carrier, which can cause damage to equipment or the transporting vehicle or injury to a user engaged in the act of loading or unloading the carrier at the rear of the transporting vehicle. For improved safety, the present invention comprises assemblies for preventing the inadvertent rotation of pivoting members.

A vehicle mountable load carrier according to the present invention broadly comprises an upright post joined to a stinger suitable for insertion into a hitch mount receiver of a vehicle. The stinger provides a connection between the vehicle and the upright post. An extendable support arm couples the upright post to an upright load supporting member upon which equipment, e.g., one or more bicycles, may be arranged. The extendable support arm has an open position and a closed position, made possible by uniting a first arm section with a second arm section by means of a pivoting coupling. This arrangement allows movement of at least the second section to place the extendable support arm in either the closed position or the open position. A releasable lock forms part of the pivoting coupling to retain the extendable support arm in a locked-open position. The locked-open position provides convenient access for a user to load or unload equipment.

An extendable support arm according to the invention can be placed in a locked-closed position using a number of interacting structures attached to the ends of the first and second arm sections opposite the pivoting coupling. Interacting structures can include, for example, a lock-up pin and a lower locking handle. Release of the extendable support arm from the locked-open position and rotation to the locked-closed position generally occurs in preparation for vehicle operation and equipment transport.

At the completion of transport, a number of steps can be accomplished to convert load carrier from the locked-closed position to the locked-open position. In one embodiment, the carrier can be opened by loosening a lower locking handle and removing a lock-up pin, as will be described in greater detail in the following section. An upper locking handle may also be loosened to allow arms to swivel to move equipment, bicycle(s), away from the carrying vehicle. Rotation of the sections of the extendable support arm about the pivoting coupling extends the support arm to its open position. Other equipment retaining devices may also be required to be loosened to allow support arm sections to rotate to the open position. Activation of a releasable lock of the pivoting coupling places the extendable support arm in a locked-open position. In one embodiment, the pivoting coupling includes a tab that has an opening therein to receive a pin, referred to herein as a "hold-open pin", to maintain the fully-open, extendable support arm in the locked-open position. Maintaining the support arm in the locked-open position prevents the load carrier from inadvertently swinging to the closed position and provides safe unloading of equipment.

More particularly, the present invention provides a vehicle mountable load carrier comprising a stinger for insertion in a hitch mount receiver of a vehicle; an upright post connected to the stinger; and an upright load supporting member coupled to the upright post by an extendable support arm. The extendable support arm has an open position and a closed position and includes at least a first section and a second section having a pivoting coupling therebetween to move at least the second section between the closed position and the open position. The pivoting coupling includes a releasable lock to retain the extendable support arm in a locked-open position.

In at least one embodiment of the present invention, a vehicle mountable load carrier includes a stinger for insertion in a hitch mount receiver of the vehicle. An upright post connected, and preferably fixedly joined, to the stinger includes a releasable locking handle and a crown portion that has an opening formed therein. The load carrier also has an upright load supporting member having a distal end and a proximate end having a releasable locking rod attached thereto to engage the opening of the crown portion of the upright post to thereby produce an engaged condition wherein the locking rod remains in the opening due to force applied thereto by a biasing element. An extendable support arm, coupling the upright load supporting member to the upright post, includes at least a first section and a second section having a pivoting coupling therebetween for movement of at least the second section whereby the extendable support arm has an open position and a closed position. Adjacent to the pivoting coupling, a releasable lock prevents movement of the pivoting coupling when the extendable support arm reaches the open position. An equipment cradle mounted on the distal end of the upright load supporting member rotates as allowed by a releasable locking knob that controls rotation of the equipment cradle between a fixed position and a release position.

The benefits described above apply generally to the exemplary devices and mechanisms disclosed herein for a swing-away load carrier including rotating elements lockable for safer loading and unloading of sports equipment. The specific structures through which these benefits are delivered will be described in detail herein-below.

BRIEF DESCRIPTION OF THE DRAWINGS

The invention will now be described in greater detail, by way of example only, with reference to the attached drawings, in which.

DETAILED DESCRIPTION OF THE INVENTION

As required, detailed embodiments of the present invention are disclosed herein; however, it is to be understood that the disclosed embodiments are merely exemplary and that the present invention may be embodied in various and alternative forms. The figures are not necessarily to scale; some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
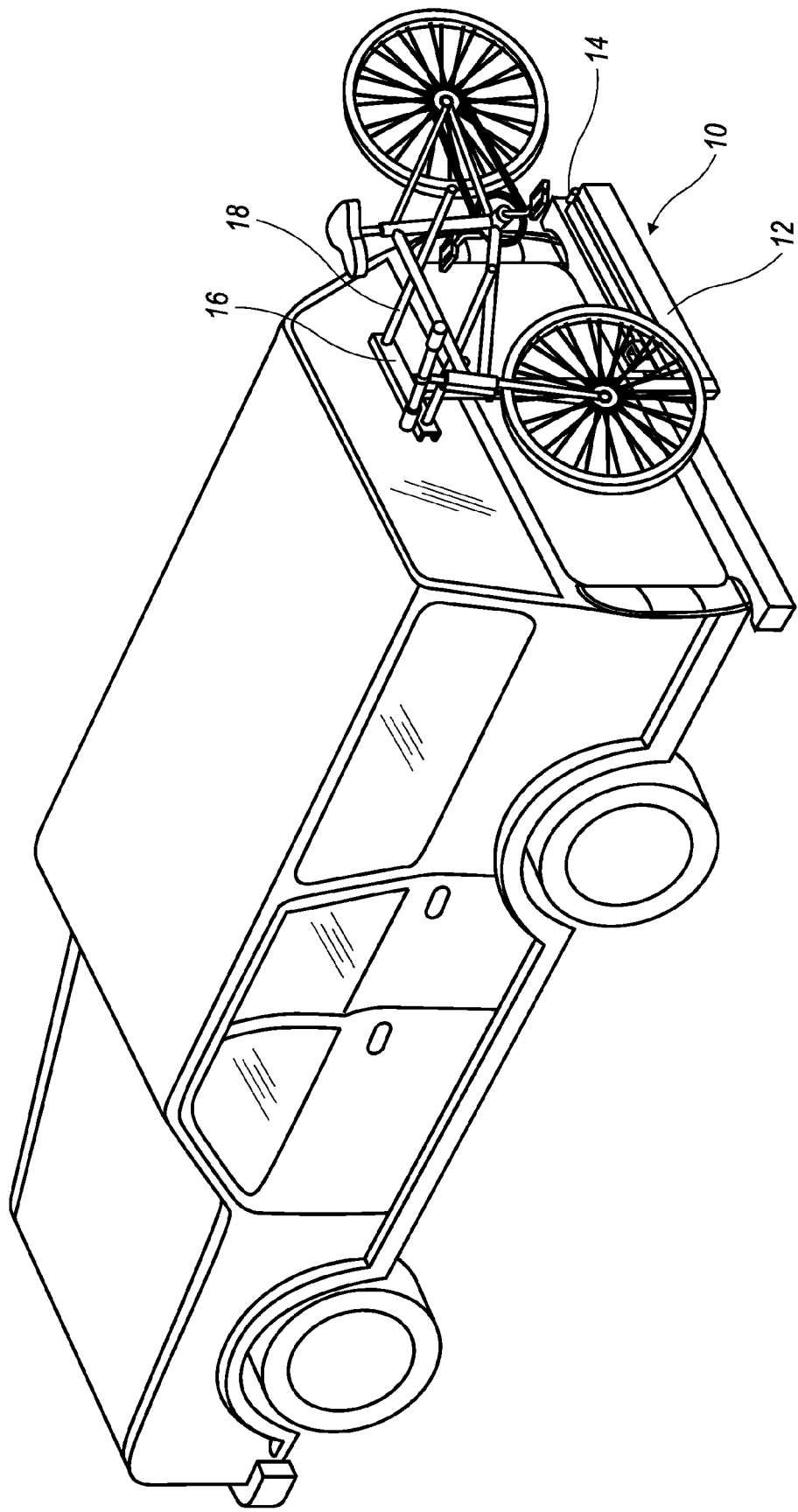
FIG. 1 is a perspective view of a load carrier according to the present invention mounted upon a transport vehicle.

Referring now to the figures wherein like reference numerals identify like parts throughout the several views, FIG. 1 shows load carrier 10 according to the present invention used for supporting equipment, e.g., one or more bicycles, at the rear of a transporting vehicle. Load carrier 10 includes swing-away, extendable support arm 12 having pivoting coupling 14 that provides movement of extendable support arm 12 from a closed position to an open position. In the open position of the extendable support arm, a bicycle is more accessible for safer loading and unloading. Attachment of a bicycle to load carrier 10 according to the present invention utilizes equipment cradle 16, which has at least one, and preferably two, support bars 18 disposed outwardly thereof. Support bars 18, also referred to herein as bike arms, include means for securing bicycles to equipment cradle 16. Securing means can include, for example, straps, belts, ropes, clamps and elastic cords and the like. As shown in FIG. 1, a load carrier according to the present invention may be seen as a two-part structure including a lower part, that attaches to a transporting vehicle, and an upper part, which broadly includes cradle 16 and bike arms 18. Preferably, cradle 16 and bike arms 18 are configured to secure and transport up to four bicycles.

Figure 2:
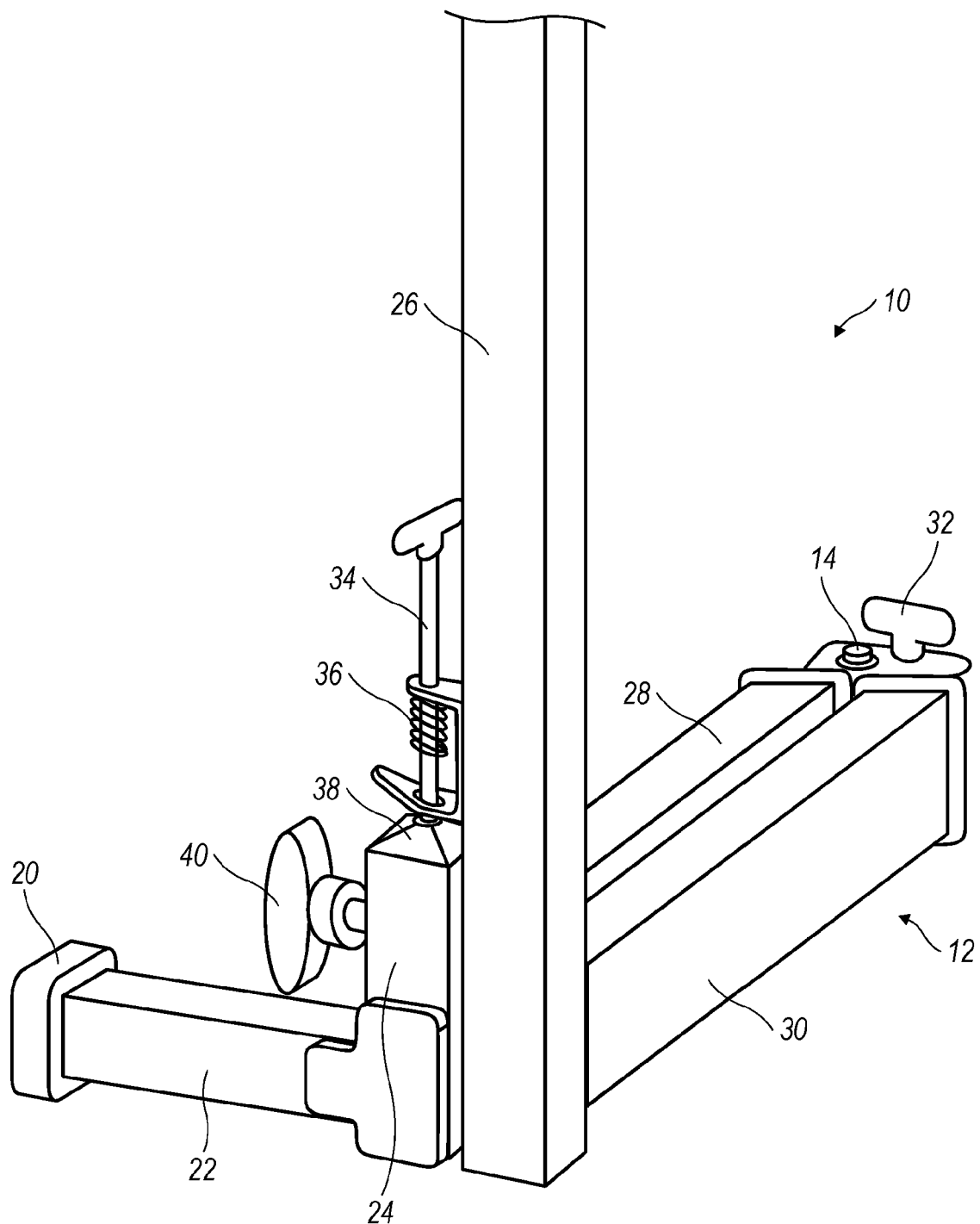
FIG. 2 is a partial perspective view of a load carrier according to the present invention mounted to an equipment hitch of a vehicle.

FIG. 2 provides detail of the lower part of load carrier 10 and means for attaching load carrier 10 to a vehicle using hitch mount receiver 20. Load carrier 10 includes connecting arm 22, more commonly referred to as stinger 22 that fits inside hitch mount receiver 20 for attaching load carrier 10 to a vehicle.

Upright post 24 is securely attached, preferably fixedly secured, to the end of stinger 22 opposite the end inserted in hitch mount receiver 20, and represents a junction between stinger 22 and the swing-away portion of load carrier 10. As illustrated in FIG. 2, upright load supporting member 26 provides connection between the lower part of load carrier 10 and the upper part of the load carrier that includes equipment cradle 16. Upright load supporting member 26 may be viewed as having a proximate end opposite a distal end connected to cradle 16.

Figure 4:
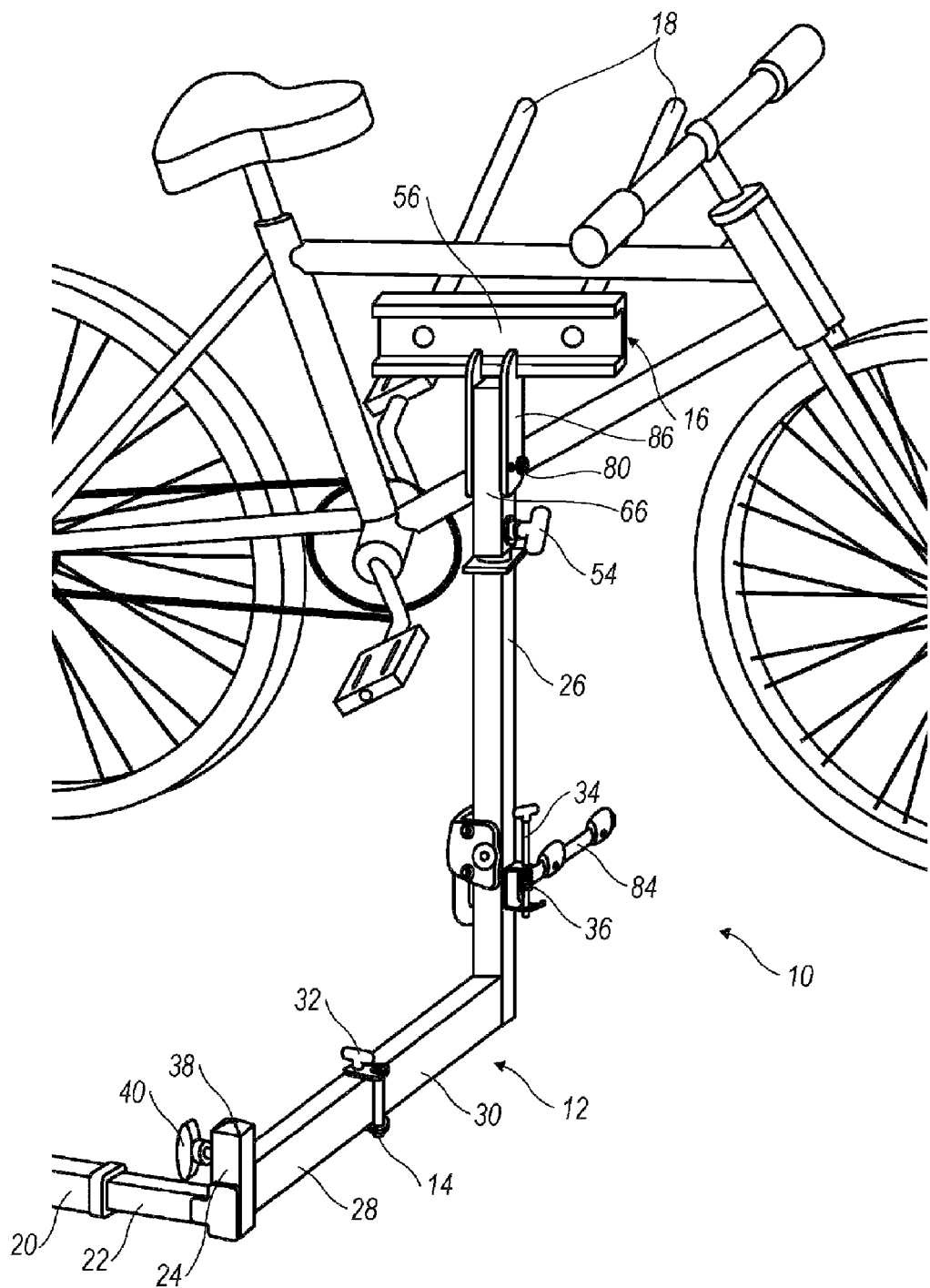
FIG. 4 is a partial perspective view of a load carrier according to the present invention in a locked-open condition.

Disposed between upright post 24 and upright load supporting member 26 is extendable support arm 12, which is adapted for movement from a closed position, as illustrated in FIG. 2, to an open position (see FIG. 4). In the closed position, upright post 24 and the proximate end of upright load supporting member 26 are adjacent to one another. When placed in the open position, extendable support arm 12 disposes upright load supporting member 26 farthest away from upright post 24 to place equipment cradle 16 outwardly of the body of the vehicle to thereby facilitate access to sports equipment, such as bicycles, carried on bike arms 18 of upper part of load carrier 10.

Extendable support arm 12 includes a number of hinged sections, preferably at least first section 28 and second section 30, which are joined together by means of pivoting coupling 14. Without restriction of rotation about pivoting coupling 14, when extendable support arm 12 is in the open position, it is possible for load carrier 10 to swing spontaneously to the closed position. Inadvertent movement of extendable support arm 12 represents an unsafe condition if it occurs during loading or unloading of bicycles to or from bike arms 18. For this reason, pivoting coupling 14 includes a releasable lock 32, typically a locking pin that is held at the end of second section 30 in a position from which it may be captured in a keeper (not shown) at the adjacent end of first section 28. It will be appreciated that a variety of engagement mechanisms may be equally useful for manually or automatically restricting movement of pivoting coupling 14 after extendable support arm 12 has been placed in the open position. Once restricted, pivoting coupling 14 maintains a locked-open condition, which may be reversed when safe to do so, by releasing the pin of releasable lock 32 from the keeper.

After loading one or more bicycles on bike arms 18 of load carrier 10, it is necessary to close carrier 10 to place the extendable support arm in a locked-closed condition for transport. Secure restraint of load carrier 10 serves to prevent hazardous conditions that can damage equipment, the transporting vehicle, or nearby vehicles if load carrier 10 is allowed to swing away from the transporting vehicle while in motion.

FIG. 2 provides one embodiment of a locking mechanism for securing upright load supporting member 26 to upright post 24 at opposite ends of extendable support arm 12. The locking mechanism includes locking rod 34 attached to upright load supporting member 26 adjacent to the proximate end thereof. Biasing element 36, represented in FIG. 2 by a coil spring, urges locking rod 34 into an opening (not shown) in crown portion 38 of upright post 24 when there is suitable alignment of locking rod 34 and upright post 24. Locking rod 34, passing through the opening in crown portion 38, may be secured inside upright post 24 using locking handle 40, typically a screw clamp. The locking mechanism described above provides dual releasable locking of upright load supporting member 26 to upright post 24 using spring biased locking rod 34 in combination with clamping locking handle 40.

Figure 3:
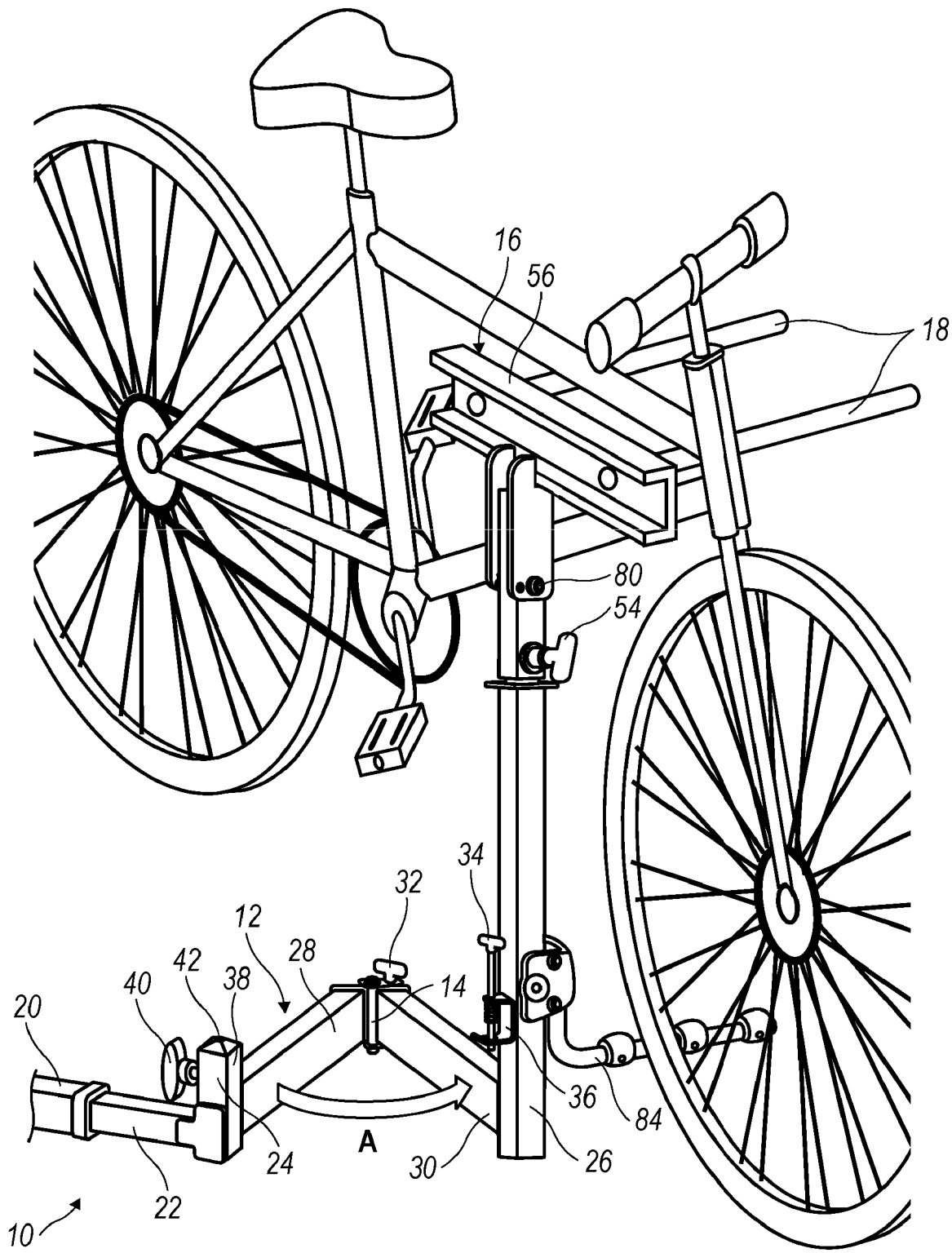
FIG. 3 is a partial perspective view of a load carrier according to the present invention in a partially open condition.

FIG. 3 illustrates opening of the lower part of load carrier 10 after release of locking rod 34 from opening 42 in crown portion 38 of upright post 24. During opening of extendable support arm 12, from the closed position to the open position, second section 30 swings away from first section 28 in the direction indicated by arrow A. Sections 28, 30 separate by rotation of pivoting coupling 14. Without applying preventative measures, opening of extendable support arm 12 can produce potentially damaging contact between the rear wheel of a bicycle (as illustrated) and the rear of the transporting vehicle (not shown). According to the present invention, this problem may be avoided by allowing rotation of equipment cradle 16 to keep the bicycle crossbar substantially parallel with the rear of the vehicle.

FIG. 4 shows load carrier 10 according to the present invention having its extendable support arm in its fully extended condition wherein manual or automatic actuation of releasable lock 32 restricts further movement of first section 28 relative to second section 30 and places the load carrier in its locked-open condition. In this condition, the one or more transported bicycles may be safely removed from bike arms 18 without concern for inadvertent rotation of upright load supporting member 26 toward upright post 24. With reference to the description of FIG. 5 and FIG. 6, rotation of bike arms 18 also occurs around the vertical axis of upright load supporting member 26. This is possible because of mounting of a cover tube 66 for rotation relative to the load supporting member 26 and attachment of bracket 56 to cover tube 66 using bracket connector 86 secured in place by a connecting screw or bolt 80. A rotation restrictor 54, also referred to herein as a releasable locking knob, controls movement of the bike arms 18 by allowing movement of cover tube 66 or applying a frictional force to restrict or prevent movement of cover tube 66, which also restricts or prevents rotation of the bracket 56 and attached bike arms 18.

Figure 5:
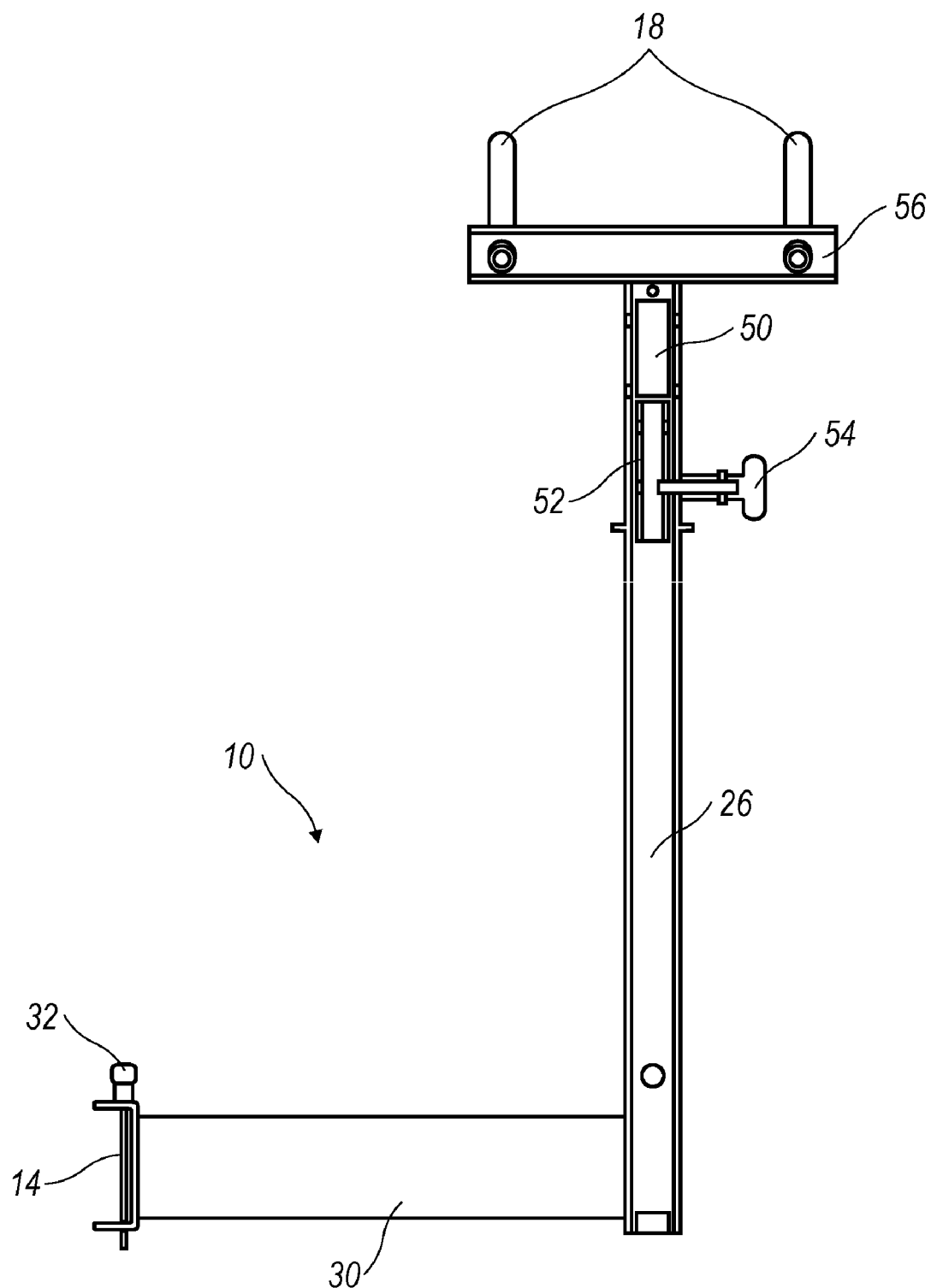
FIG. 5 is a partial cross sectional view illustrating internal structures of an equipment cradle according to the invention; and, FIG. 6 is a partial perspective detail view of rotary connection between an upright load supporting member and an equipment cradle according to the present invention.

FIG. 5, illustrates a partial cross section through equipment cradle 16 attached for rotation at the distal end of upright load supporting member 26 according to the present invention. Equipment cradle 16 includes a bracket connector 86 for placement over a cover tube 66 that fits over rotating sleeve 52 for rotation therewith when rotation restrictor 54 is released. Cover tube 66 includes port 68 for entry of rotation restrictor 54 to engage and restrict movement of sleeve 52 against cylindrical post 50 protruding from upright load supporting member 26 to be received in the bore of rotating sleeve 52. Rotation restrictor 54, inserted through an orifice 70 in the wall of sleeve 52, impinges against cylindrical post 50 to restrict movement of rotating sleeve 52 as required to restrain equipment cradle 16 from movement. A connecting screw or bolt 80, inserted through the walls of the bracket connector 86, cover tube 66 and rotating sleeve 52, engages threaded eyelet 74 providing one exemplary means to secure the cradle 16 to the load supporting member 26. This keeps bracket 56, attached between rotating sleeve 52 and bike arms 18, in a fixed position during transportation of bicycles.

Figure 6:
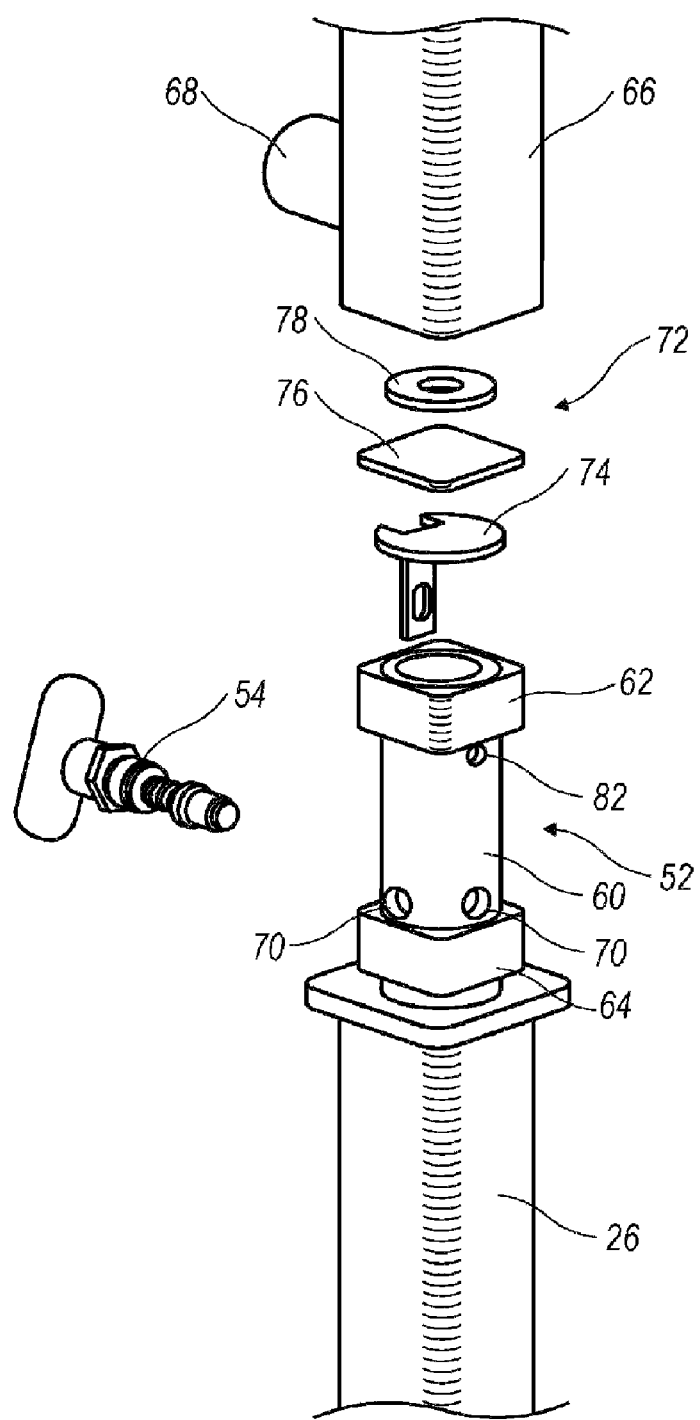

FIG. 6 provides detail of one embodiment for attaching equipment cradle 16 to the distal end of upright load supporting member 26. In this case, rotating sleeve 52 includes cylindrical tube 60 mounted on cylindrical post (not shown), leaving a space at the upper end of cylindrical tube 60. Upper collar 62 and lower collar 64, which friction fit at each end of cylindrical tube 60, have square cross-sections that complement the inner dimensions of hollow cover tube 66 that fits over rotating sleeve 52 for rotation therewith when rotation restrictor 54 is released. Cover tube 66 includes access port 68, which rotation restrictor 54 enters to engage and restrict movement of sleeve 52 against cylindrical post 50, made accessible through one of orifices 70 in the wall of cylindrical tube 60.

According to the example illustrated in FIG. 6, the space inside the upper portion of cylindrical tube 60 accommodates connector 72, including eyelet 74, square plate 76, and washer 78. Eyelet 74 may be threaded and cover tube 66 may be designed for insertion of a connecting screw or bolt 80 (see FIGS. 3 and 4) passing through open ended slot 82, in cylindrical tube 60, to engage threaded eyelet 74. Attachment of cradle 16 (see FIGS. 3 and 4) to rotating sleeve 52 may involve connection between bolt 80 and connector 72.

For further load stability, load carrier 10 may include support bar 84, also known as a "zip stick," attached at the proximate end of upright load supporting member 26 (see FIGS. 3 and 4). Zip stick 84 provides a convenient structure to which bicycles may be secured using straps, belts or clamps or other related securing means.

A swing away load carrier and its components have been described herein. These and other variations which will be appreciated by those skilled in the art are within the intended scope of this invention as claimed below. As previously stated, detailed embodiments of the present invention are disclosed herein; however, it is to be understood that the disclosed embodiments are merely exemplary of the invention that may be embodied in various forms.

What is claimed is:

1. An apparatus for allowing rotation of an equipment cradle relative to a load supporting member, comprising:
   a post protruding from an end of the load supporting member, wherein the load supporting member is attached to an end of an extendable support arm having a first section and a second section, wherein the second section swings away from the first section during opening of the extendable support arm;
   a rotating sleeve that includes a tube mounted over the post;

a bracket that is attached to the rotating sleeve and at least one arm of the equipment cradle, the equipment cradle being rotatable and the bracket being attached to the rotating sleeve by a connector;

a hollow tube that fits over the rotating sleeve and that includes an access port;

a rotation restrictor that enters the access port to engage and restrict movement of the rotating sleeve against the post during transportation of equipment positioned on the arm of the equipment cradle; and wherein the tube is a cylindrical tube that includes at least one collar having a square cross-section that complements the inner dimensions of the hollow tube.

2. The apparatus of claim 1, wherein said bracket is rigidly fixed to said connector.

3. The apparatus of claim 2, wherein said bracket is arranged in a position higher than said connector.

4. The apparatus of claim 1, wherein said rotating sleeve includes a plurality of orifices for entry of said rotation restrictor to engage said post to restrict movement of said rotating sleeve.

5. The apparatus of claim 4, wherein said rotation restrictor passes through said access port of said hollow tube and through one of said plurality of orifices in said rotating sleeve to engage said post to control rotation of said equipment cradle.

6. The apparatus of claim 5, wherein said rotation restrictor is perpendicular to said post.

7. An apparatus for allowing rotation of an equipment cradle relative to a load supporting member, comprising:

a post protruding from an end of the load supporting member, wherein the load supporting member is attached to an end of an extendable support arm having a first section and a second section, wherein the second section swings away from the first section during opening of the extendable support arm;

a rotating sleeve that includes a tube mounted over the post;

a bracket that is attached to the rotating sleeve and at least one arm of the equipment cradle, the equipment cradle being rotatable and the bracket being attached to the rotating sleeve by a connector;

a hollow tube that fits over the rotating sleeve and that includes an access port;

a rotation restrictor that enters the access port to engage and restrict movement of the rotating sleeve against the post during transportation of equipment positioned on the arm of the equipment cradle; and wherein the connector includes an eyelet engageable by a bolt passing through the rotating sleeve for attachment of the equipment cradle to the rotating sleeve.

8. The apparatus of claim 7 wherein the eyelet is received inside the rotating sleeve and the bolt passes through an aperture in the rotating sleeve.

9. The apparatus of claim 7, wherein said bracket is rigidly fixed to said connector.

10. The apparatus of claim 7, wherein said rotating sleeve includes a plurality of orifices for entry of said rotation restrictor to engage said post to restrict movement of said rotating sleeve.

11. The apparatus of claim 10, wherein said rotation restrictor passes through said access port of said hollow tube and through one of said plurality of orifices in said rotating sleeve to engage said post to control rotation of said equipment cradle.

12. The apparatus of claim 11, wherein said rotation restrictor is perpendicular to said post.

13. The apparatus of claim 9, wherein said bracket is arranged in a position higher than said connector.

* * * * *